INVENTOR.
Donald C. Rockola
BY
Horton, Davis,
Brewer & Brugman Attys

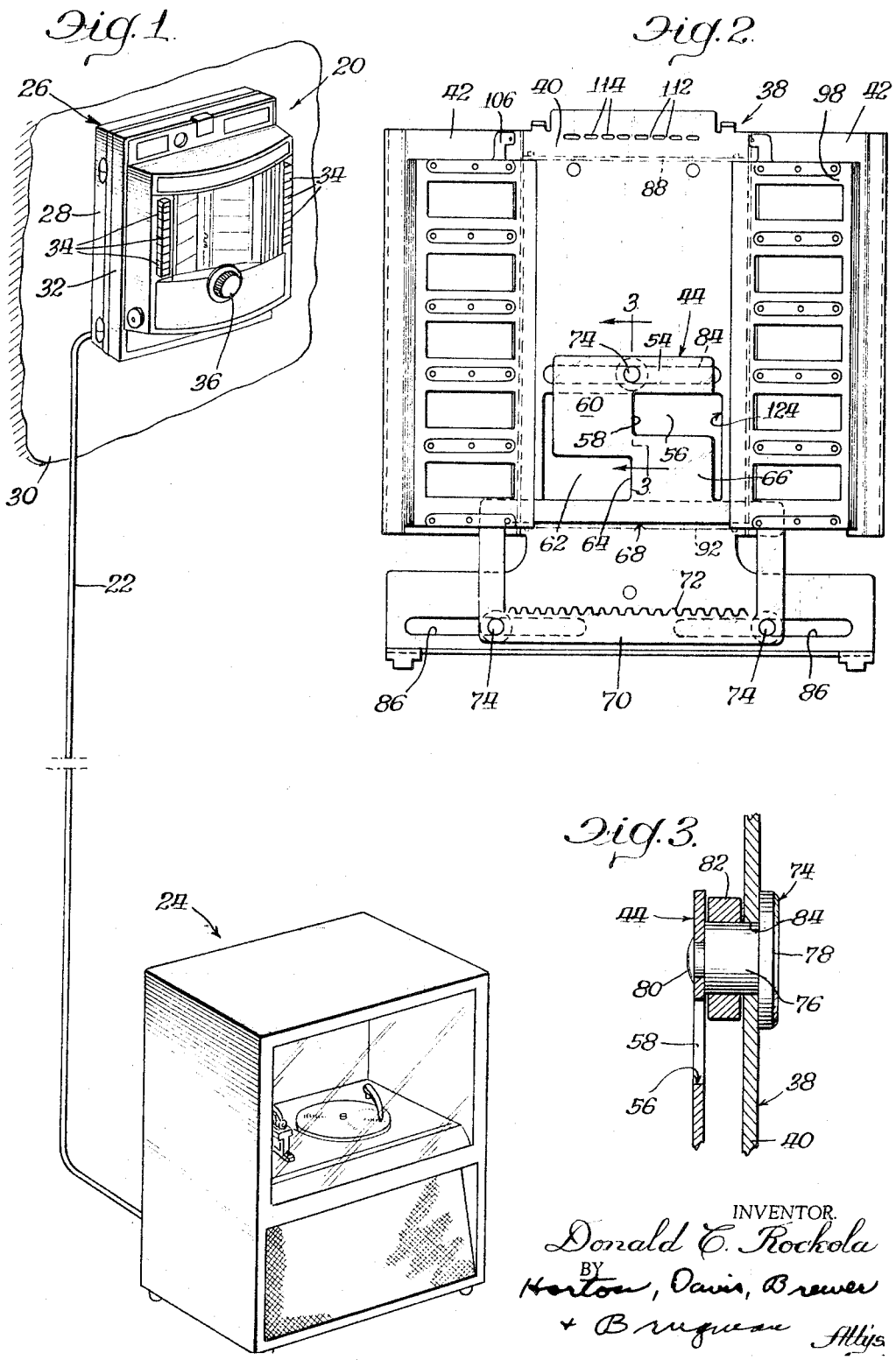

Aug. 23, 1966
D. C. ROCKOLA
3,268,868
KNOB OPERATED PAGE SELECTION APPARATUS FOR AUTOMATIC
PHONOGRAPH CONTROL BOX
Filed Nov. 13, 1962
5 Sheets-Sheet 3
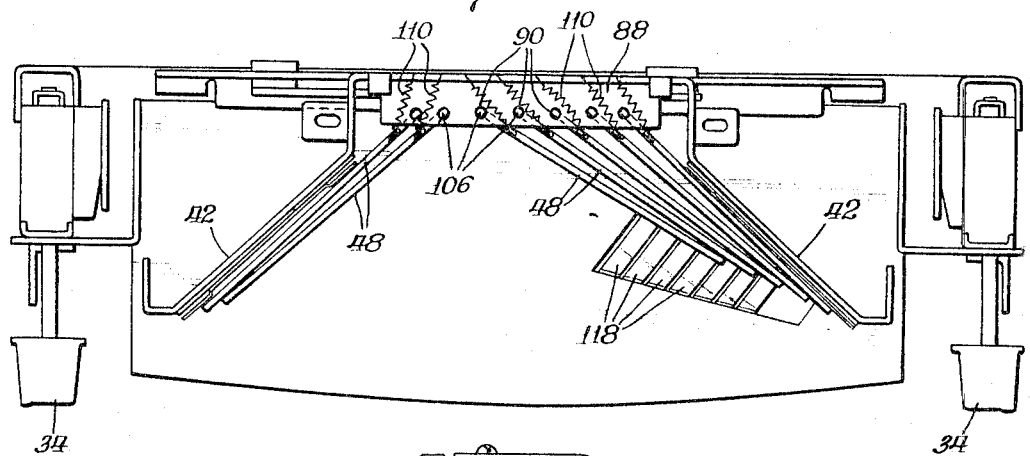
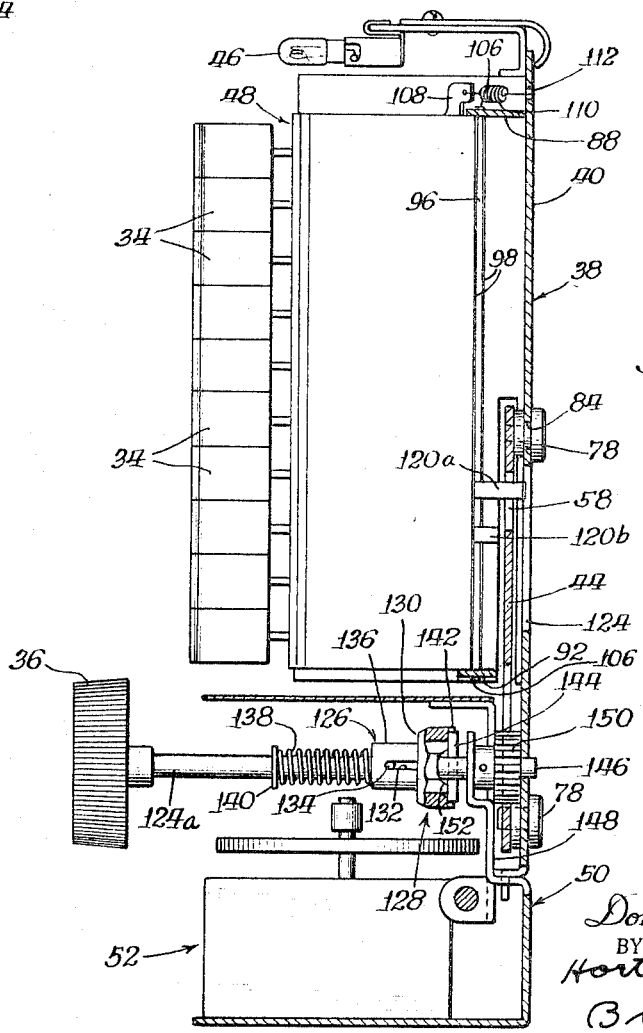
INVENTOR.
Donald C. Rockola
BY
Horton, Davis, Brewer,
Brugman
Attys.

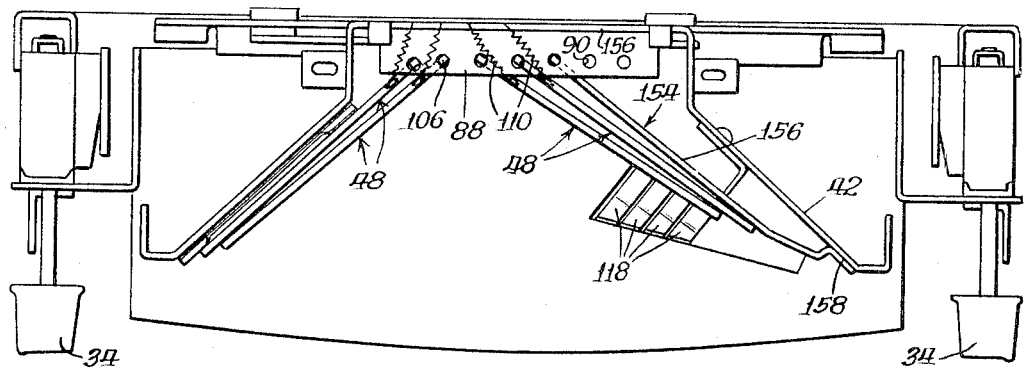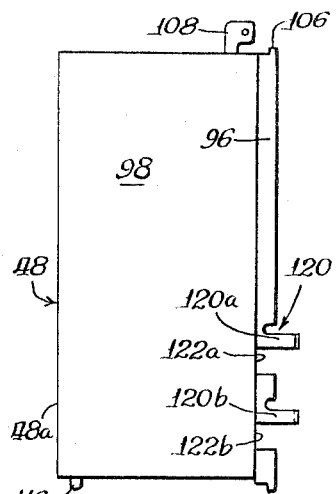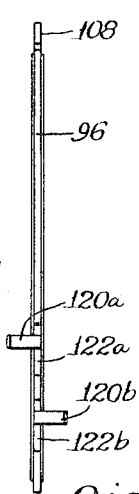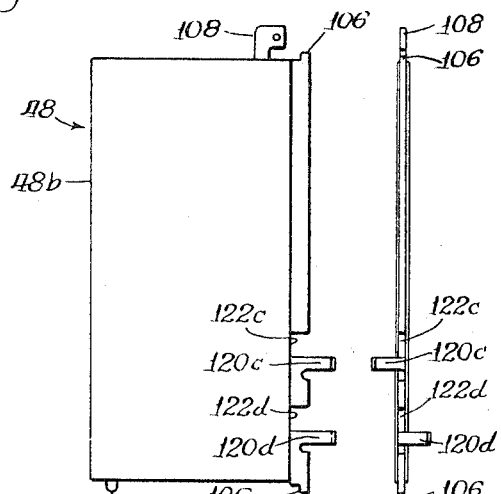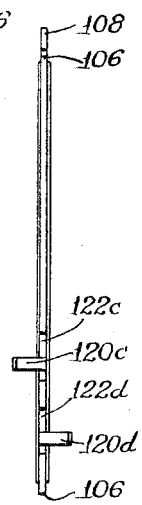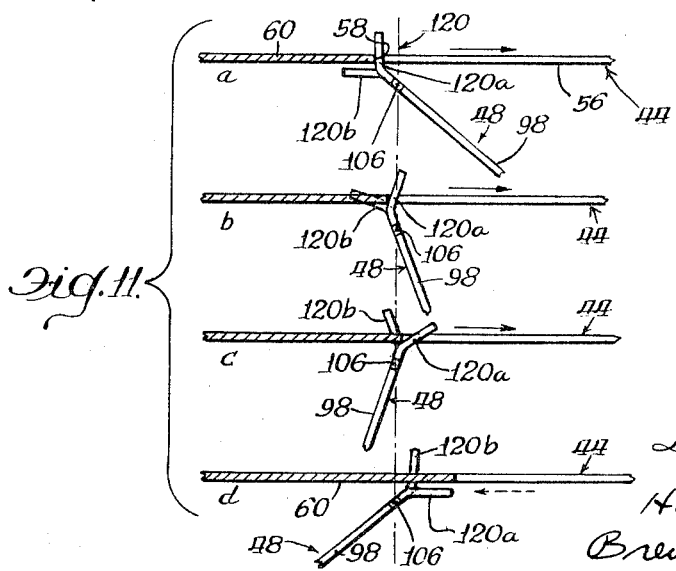

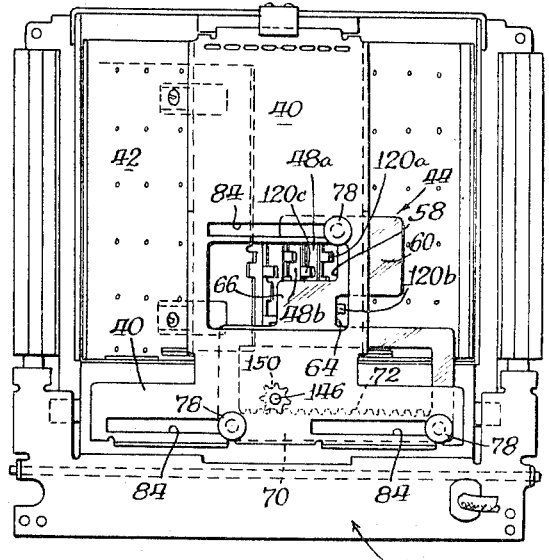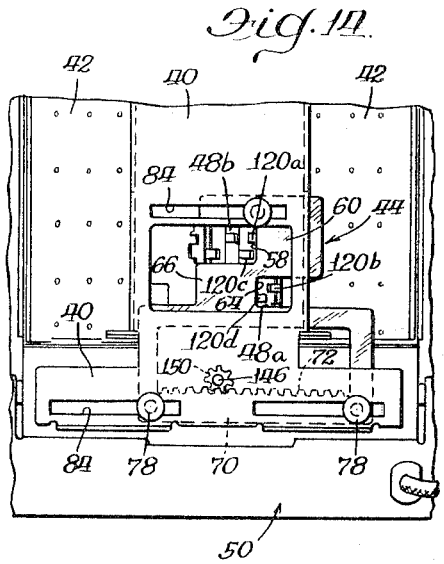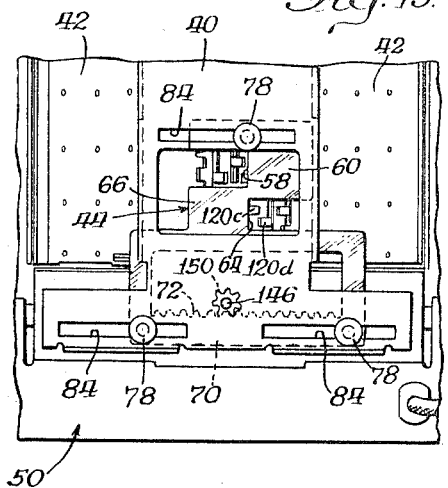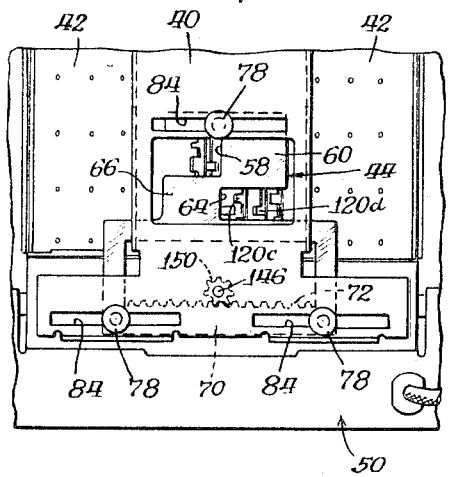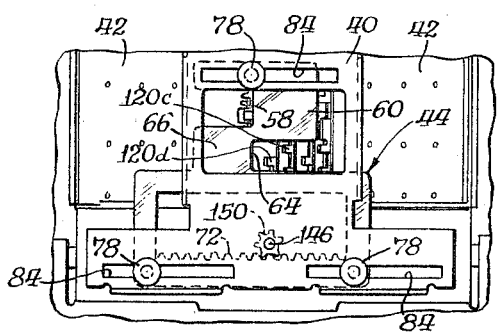

United States Patent Office 3,268,868
Patented August 23, 1966

3,268,868
KNOB OPERATED PAGE SELECTION APPARATUS FOR AUTOMATIC PHONOGRAPH CONTROL BOX
Donald C. Rockola, Chicago, Ill., assignor to Rock-Ola Manufacturing Corporation, Chicago, Ill., a corporation of Delaware
Filed Nov. 13, 1962, Ser. No. 236,821
12 Claims. (Cl. 340—162)

The present invention relates to automatic phonographs, and more particularly, to selectively operable control mechanism therefor.

The invention resides particularly in improvements in the general type of control mechanism disclosed and claimed in Patent No. 2,909,761, issued October 20, 1959, to David C. Rockola. That mechanism includes a number of "pages" which are movable to each of opposite positions, and two of them in such opposite positions display a number of record titles which is less than the total number of records contained in the phonograph. The pages in their total number of combinations of positions for presenting titles of records is equal to the total number of record selections in the phonograph. A plurality of push buttons are also provided, one for each record title in one setting or combination of the pages. The pages actuate electrical switches and thereby set up permutations in their various positions in such a way that each push button when actuated by a patron is operative for selecting a title according to which combination of positions the pages are disposed in at the time of actuation of the push button.

A broad object of the present invention is to provide improved apparatus of the foregoing character.

A more specific object is to provide such apparatus all of which is contained within an enclosure, but with novel actuating means which includes a single, manually manipulable knob exposed to the exterior of the enclosure.

Another object is to provide a mechanism of the foregoing character having novel means for positively moving the pages between their opposite limit positions.

A further object is to provide mechanism of the foregoing character in which the pages may be turned or flipped by a continuous movement of the manually manipulable knob in either direction of movement.

A still further object is to provide mechanism of the character referred to immediately above in which the pages are positively locked in position by the means for actuating them in any given stationary position of the actuating means.

A still further object is to provide mechanism of the foregoing character having a normal relatively large capacity for pages, but which can be easily adapted to a lesser capacity arrangement for convenient use with phonographs of smaller record capacity.

Other objects and advantages of the invention will appear from the following detailed description taken in conjunction with the accompanying drawings in which:

FIG. 1 is a general illustration of a selection control mechanism of the present invention in relation to the automatic phonograph with which it is associated;

FIG. 2 is a front view of a frame member and certain associated parts contained in the mechanism;

FIG. 3 is a large-scale detail sectional view taken at line 3—3 of FIG. 2;

FIG. 5 is a view from the top of FIG. 4;

FIG. 6 is a sectional view taken at line 6—6 of FIG. 4;

FIG. 7 is a side view of a leaf utilized in certain of the pages of the mechanism;

FIG. 8 is a right edge view of the leaf of FIG. 7;

FIG. 9 is a side view of another form of leaf used in certain of the pages of the mechanism;

FIG. 10 is a right edge view of FIG. 9;

FIG. 11 is a series of fragmentary views showing a page and the means for turning it, the successive views representing different positions in the turning movements thereof;

FIG. 12 is a top view similar to FIG. 5, but with certain pages removed and a spacer means interposed therein;

FIG. 13 is a view from the rear side of the mechanism of FIG. 4 and showing various elements in a first position of movement;

FIG. 14 is a view similar to the lower central portion of FIG. 13, but showing parts in a different and relatively progressed position;

FIG. 15 is a view similar to FIG. 14 showing the parts in a further position;

FIG. 16 is a view similar to FIGS. 14 and 15, but with the parts in a still different position; and FIG. 17 is a view similar to FIGS. 14, 15 and 16 with the parts in still another and progressed position.

Figure 4:
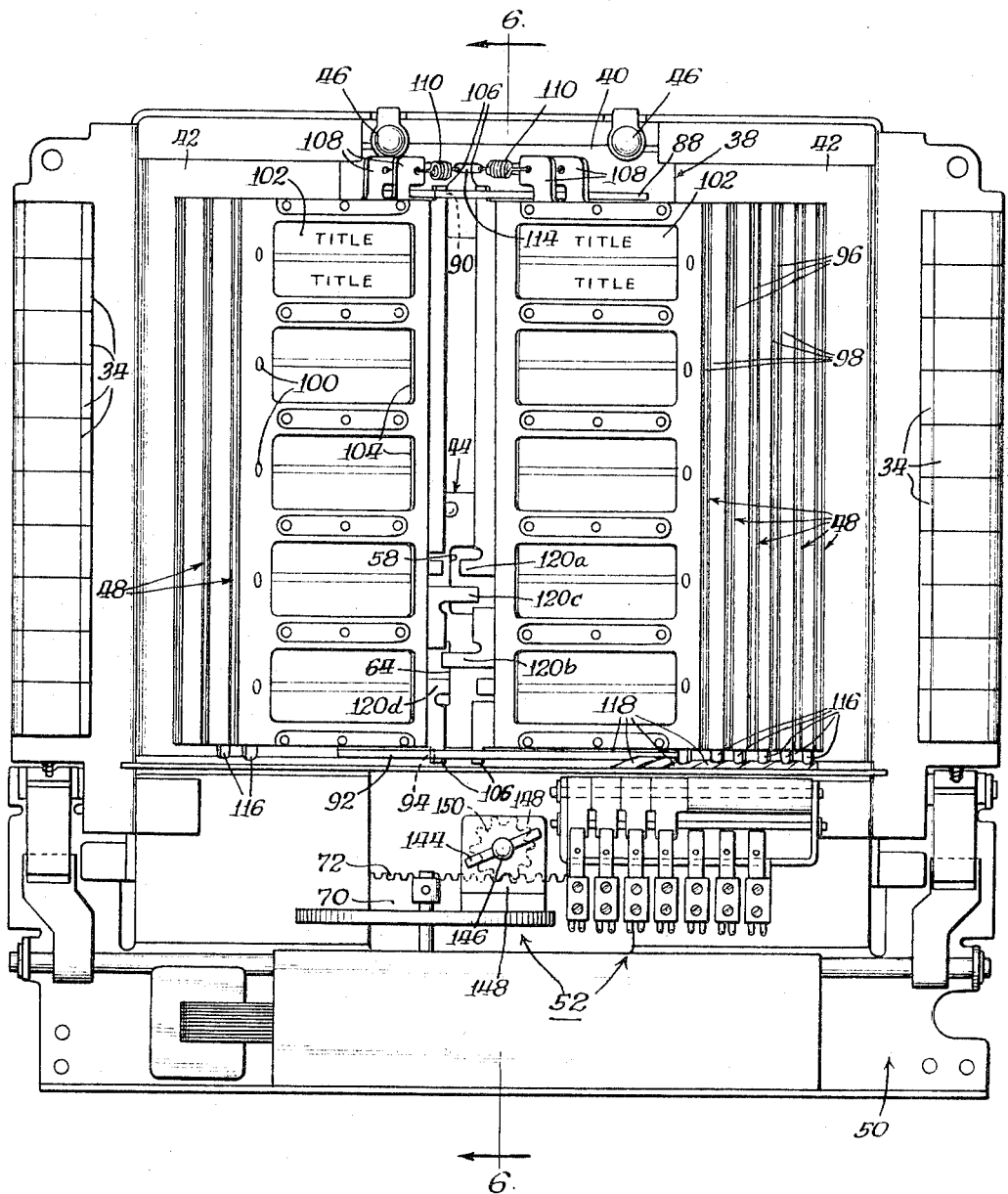
FIG. 4 is a front view of the internal portion of the mechanism with the enclosing casing means removed therefrom.

Referring now in detail to the drawings, attention is directed first to FIG. 1 showing the control device of the present invention in its entirety in conjunction with an automatic phonograph controlled by it. The control device, which is also commonly referred to as a wall box, is indicated in its entirety at 20 and is connected by a cable 22 to an automatic phonograph 24. As is quite generally known in many establishments or locations an automatic phonograph is provided with a plurality of wall boxes disposed for convenient use by patrons in different parts of the establishment. The phonograph may or may not be in the open and in observation by the patrons, but the wall boxes generally are at remote positions relative to the phonograph so that the patron may select records for playing by the phonograph by actuating one of the wall boxes. For convenience, only a single wall box is represented here.

The control device or wall box 20 includes a casing 26 made up of a back portion 28 which may be mounted on a convenient support such as indicated generally at 30, and a front portion 32 secured to the back portion, the two portions together enclosing most of the operating parts of the mechanism. In the present instance and in the case of previous wall boxes of this general type, a plurality of selection buttons 34 project through openings in the casing, accessible to a patron for selecting purposes. In the present instance there is also exposed to the exterior, at the front for manipulation by the patron, a control knob 36 which is utilized for performing certain steps in the selecting operation which will be explained more fully hereinbelow.

As noted hereinabove, the wall box of the present invention is of the type having a plurality of pages movable between opposite limit positions for exposing to the patron the titles of the recordings on the records in the phonograph. These pages, in addition to exposing the names of titles of the recordings, control circuitry in the selecting operations, and specifically manipulate electrical switches in at least one of their limit positions. Although the foregoing general type of control device or wall box is known, the present invention has to do with specific control means for actuating the pages, this control means including the manually actuated knob 36 referred to above.

Referring now particularly to FIGS. 2 to 6 inclusive for a disclosure of the main portion of the internal operating mechanism, a main frame member 38 is provided, which may be a sheet metal stamping for example, or other convenient construction and formation. This frame member includes a back element 40 which is preferably a plane member, and side wings or wing portions 42 inclined forwardly at an acute angle to the plane of the back element. These side wings 42 are preferably separate elements secured to the back member, so made for convenience in manufacture and to provide convenient spaces for movements of the slider 44 to be referred to again hereinbelow. The frame member 38 may also be provided with other extensions such as for operably mounting the push buttons 34, the illuminating lamps 46 (FIGS. 4 and 6) for illuminating the program tabs on the pages now identified as 48.

The frame member 38 is incorporated in an assembly as shown in FIGS. 4 and 6, which includes another frame member 50, the two suitably secured together, the latter frame member supporting various other control components identified generally at 52 and which need not be identified individually, these components being standard components in this general type of wall box, and utilized, for example, for converting impulses produced by swinging the pages 48 and actuating the push buttons 34, and transmitting them to the phonograph. It will be appreciated that the frame assembly, including the frame members 38 and 50, and represented in FIGS. 4 and 6, is mounted as a whole in the casing 26. The slider 44 referred to above is a plate-like member lying in a single plane and provided with certain special conformations to be described in detail. The slider is arranged for transverse movements in its own plane, to the right and left of the line of sight of the observer, and includes a top portion 54 below which is a void or cut-out portion 56 defining a working edge 58, and a solid portion 60 in trailing direction relative to the edge 58 in corresponding direction of movement of the slider, or to the right as viewed in FIG. 2. In the lower portion is another void or cut-out portion 62 defining another working edge 64 and a solid trailing portion 66 relative to the edge 64 in the other direction of movement, or to the left as viewed in FIG. 2. Below these portions just described is a rectangular cut-out portion 68 defined on the bottom by a bar 70 having a rack on its upper edge. The slider 44 is mounted on the frame member 38 for its sliding movements by three mounting means 74 at three wide-spaced points, one of which is shown in section in FIG. 3. This mounting means is preferably in the form of roller means having a roller element 76, an enlarged head 78, and a rivet element 80, together with a spacer element 82 surrounding the roller element. The upper mounting means 74 is operably disposed in a horizontal slot 84 in the back element 40 of the frame member, while the two lower mounting means 74 are operably disposed in horizontal slots 86 in the lower, outer portions of the frame member. Each roller element 76 (FIG. 3) is disposed in the corresponding slot with the enlarged head portion 78 bearing against the back surface of the back element (e.g. 40) while the spacer element 82 is disposed between the back element and the slider with the rivet element 80 projecting through a hole in the slider and peened over the front surface thereof.

Attention is next directed to FIGS. 4 and 5 for the manner in which the pages 48 are mounted in the frame assembly. The frame assembly is provided with a top horizontal, forwardly extending flange 88 with a plurality of apertures 90 therein arranged in a transverse row in a vertical plane parallel with the plane of the back element 40 and also of the plane of the slider 44, as will be described more fully hereinbelow in the description of the operation of the mechanism. The frame assembly is also provided with a lower horizontal element 92 (FIG. 4) suitably mounted and similarly provided with a plurality of apertures 94, identical in number with and aligned with the respective apertures 90 in the top flange. The aligned apertures are adapted for receiving pivot elements in the pages 48, in the manner to be described below. The apertures 90 and 94 are seven in number, as will be observed in FIG. 5, for the purpose of accommodating a maximum of seven pages, but the invention also includes an arrangement for adapting this same construction to a lesser capacity phonograph by mounting a lesser number of pages, for example, four, and interposing a spacer means as will be described hereinbelow in connection with FIG. 12.

Each page 48 includes a core element or "leaf" 96 with program holder elements 98 on opposite sides thereof. The program holder elements 98 may be secured to the leaf in any suitable manner, such as by rivets 100 (FIG. 4) with spaces between themselves and the leaves for inserting tabs 102 thereinto for exposure through apertures or windows 104 for observation by the patron. These program tabs may be readily removed and inserted by a repairman after removing the outer casing portion 32 for exposing them. Each page 48 is provided with aligned tabs 106, formed on the core or leaf along an axis at one edge of the page, and these tabs are pivotally mounted in aligned ones of the apertures 90 and 94 in the flange 88 and element 92. The pages thus mounted for swinging movement about the axis extending through the tabs 106 are movable between opposite limit positions as limited by the side wings 42, the outermost ones of the pages engaging the respective wings, while the inner pages engage the outer ones. Preferably each page is provided with a tab 108 on its upper edge displaced from the corresponding tab 106 for securement of one end of a tension coil spring 110, the other end of which is secured to the frame member 38 at a suitable means, such as by integral pieces 112 between the apertures 114 (FIG. 2). These coil springs serve to bias the pages over center after they have been moved to such position by the slider 44, as explained hereinbelow.

Each of the side wings 42 is provided with a program holder element 98 (FIG. 2) for mounting program tabs therein, these side wing portions cooperating with the pages in a known manner, as when all of the pages are disposed at one side in one limit position wherein the corresponding exposed side wing portion and the exposed side of the adjacent and opposed page represent interfacing pages of a book.

For convenience each page 48 contains five tabs on each side, each tab representing both sides of a record, and thus one side of a page exposes the titles of ten recordings, and the two interfacing sides of the two exposed pages represent ten records, or twenty titles. The push buttons 34 are twenty in number, corresponding to the number of record titles exposed at any one time, there being ten at each side aligned with the ten titles of the page disposed at that side.

Each page 48 is provided with a small projection 116 on its lower end adjacent its swinging edge for engagement with a respective one of a plurality of actuating buttons 118 of switches (otherwise not shown). These switches are disposed in one of the control components 52 (FIG. 4) and operate to control the pulses transmitted through those components to the phonograph. These switches are identical in number with the pages so that as each page is moved to the corresponding side of the assembly, e.g., to the right in FIGS. 4 and 5, the switches are actuated. This switching arrangement is now known.

The pages 48 are alternately of slightly different construction, being identified as "odd" and "even," these designations, however, not being related to odd and even designations of the sides of the records, but the two forms being designed with respect to each other, in this connection, for enabling more compact positioning of all the pages in the assembly. The two kinds of pages are identified as 48a and 48b respectively. Each page 48 is provided with two fingers 120, which for convenience in reference thereto, in the two pages together, are individually identified as 120a, 120b, 120c, 120d.

It will be observed that the two fingers 120a and 120b on the page 48a are displaced relative to the fingers 120c and 120d on the page 48b, the spacing of the two fingers on each page, however, being the same. Adjacent the fingers 120 are notches or cut-out portions 122, which for convenience in reference thereto, in the two pages together, are individually identified as 122a, 122b, 122c and 122d. The fingers 120 on one page are aligned with the notches 122 on the corresponding page so that as the pages are swung to angular positions in the assembly, the fingers are enabled to swing into corresponding notches.

The fingers are of such length as to project through an opening 124 (FIG. 2) in the back element 40 for actuation by the slider 44. The fingers on each page are disposed at an angle relative to each other as best seen in FIG. 11. Each of the upper fingers of the two pages, odd and even, are arranged for engagement by the upper working edge 58 of the slider, while the lower fingers on the two pages are arranged for engagement by the lower working edge 64 on the slider. Starting from a position shown at FIG. 11a, a page 48 is disposed in one of its limit positions lying against the corresponding side wing 42, or an underlying page. In such position, one of the fingers, 120a, is projected through the void 56 and adjacent to or engaging the working edge 58. As the slider moves in the corresponding direction the working edge 58, by engaging the finger 102a, swings the page to the opposite position, toward or against the opposite side wing 42. This movement is represented in the series of steps in FIG. 11. The other finger 120b in the example given is arranged for projection into the void 62 in the movement just referred to, this void being disposed immediately to the left of the void 56 as viewed in FIG. 11. The angle of disposition of the pages at one side as determined by the side wings 42, and the angle between the fingers 120a and 120b on the page, are so related relative to the positions of the working edges 58 and 64 that as the slider moves as just described (to the right, FIG. 11) the finger 120b is enabled to project into the void 62 in view of the simultaneous movement of the working edge 64 which moves out of the path of the movement of the finger 120b. The working edges 58 and 64 are, in the present instance, substantially in vertical alignment, but this relation is not necessary, since the relations between the elements and components may be varied with a substantial range.

As the slider moves in the direction mentioned (to the right, FIG. 11) the solid portion 60 trailing the working edge 58 engages the finger 120a and when the slider is in such position relative to the page, the arrangement prevents the movement of the page in the opposite direction, and additionally, any uppermost page will, of course, prevent such movement of an underlying page. It will be appreciated that the springs 110 (FIG. 5) yieldingly retain the pages snugly in position against any play that may exist between the fingers 120 and slider 44.

It will be understood that the movement in the opposite direction of the slider (to the left, FIG. 11) is essentially the same with respect to that described above in connection with FIG. 11, but in such case the working edge 64 engages the finger 120b and the finger 120a falls into the void 56 following the movement of the working edge 58 out of its path of movement.

Attention is also directed to FIGS. 13 to 17 inclusive which show the progression of the slider 44 in turning the succession of pages, each successive figure of this group showing the complete step in moving a page from one opposite limit position to the other, relative to the other, relative to the preceding figure. These figures show the assembly from the opposite side of that represented in FIGS. 2 and 4 and thus, the various elements are oppositely oriented. Referring first to FIG. 13, for example, the slider is in an extreme position where the upper working edge 58 is disposed ready to engage the first finger 120a on the adjacent page 48a. This position corresponds to that in FIG. 11a. The finger 120a extends through the void 56 and the finger 120b is disposed in or near a position parallel with the plane of the slider, or that shown in FIG. 11a. When the slider moves from the position of FIG. 13 to that of FIG. 14, the upper finger 120a is thrown over and the lower finger 120b is extended into the void 62. The working edge 58 is then in position to engage the upper finger 120c on the second page 48b and then in moving from the position in FIG. 14 to the position of FIG. 15, the second page is turned or flipped over, and in such position, which is that represented in FIG. 15, the upper finger 120c is disposed in or near a position parallel with the plane of the slider and the lower finger 120d extends into the void 62. The third page is the same as the first, and the fourth the same as the second, and the two steps just referred to are repeated in the operation represented in FIGS. 16 and 17.

When adjacent pages are in opposite positions, i.e., turned to relatively open position, the intermeshing of the fingers 120 of one page with the notches 122 of an adjacent page will be found more significant, allowing closer positioning of the adjacent pages than would otherwise be possible. This relation is shown to good advantage in FIGS. 13–17, as well as in FIG. 4.

It will be noted that FIGS. 13 to 17 show only four pages, but it will be understood that the succeeding steps in turning the pages will be a repetition of that just described. In this direction, attention is directed to FIG. 12 and the description hereinbelow in which a lesser number of pages, for example, four, as shown in FIGS. 13 to 17, is employed.

As stated hereinabove, the invention includes novel means for positively turning the pages between their opposite limit positions, and more particularly, by a single, manually manipulable element on the exterior of the casing or enclosure. This element is the knob 36 referred to above. This knob is suitably mounted on the outer end of a shaft 124a on the inner end of which is one portion 126 of a clutch indicated in its entirety at 128 interposed between the knob and the slider. The clutch portion 126 includes a collar 130 slidable on the shaft and provided with longitudinal slots 132 in a shank portion 136, receiving a cross pin 134 in the shaft. A compression spring 138 surrounds the shaft and is interposed between the clutch portion 126 and a washer 140 on the shaft biasing the clutch portion inwardly in clutching direction, or to the right in FIG. 6.

The collar 130 is provided with cross grooves 142 in its inner end face for receiving the end portions of a pin 144 mounted transversely in one end of a stub shaft 146. The shaft 146 is rotatably mounted at one end in the back plate element 40 of the frame member 38 and, at its opposite or forward end, in a bracket element 148 forming a part of the frame assembly. A pinion 150 is secured to the stub shaft 146 and is in mesh with the rack 72, FIGS. 2 and 13 to 17. The forward end of the stub shaft 146 may be received in a central recess 152 in the collar 130; the forward end of the shaft 124 may be supported in an aperture in the outer casing portion 32. The spring 138 biases the collar 130 into friction engagement with the cross pin 144 which serves as the opposite clutch part, and upon rotating the knob 36, the pinion rotates and, acting through the rack 72, operates to slide the slider 44 in the appropriate direction. The slider is limited by any suitable abutment means, such, for example, as the end surfaces of the slots 84 and 86, and if the knob is rotated an excessive amount after the slider is moved to its limit position, the compression spring 136 yields to enable the clutch part 126 to overrun the cross pin 144, thereby eliminating any possible damage to the apparatus as may occur due to execessive turning force applied to the knob in the absence of such clutch means.

The two portions of the casing 26 are normally locked against access to the interior thereof by a patron and anyone else except an authorized service man, and the casing is generally closed except for the necessary openings for receiving the push buttons 34 and the shaft 124, coin slot, etc. Accordingly, the casing provides an effective enclosure to all of the operating mechanism of the wall box and eliminates the possibility of damage by insertion of foreign matter to the interior of the casing, and also, for example, from rough handling the pages as could be done by a patron in previously known wall boxes in which manipulating extensions of the pages extended to the exterior of the casing. In the present instance, damage in this respect is virtually impossible because the patron in turning the pages merely turns the knob 36, and if the knob is turned too hard, the clutch means yields without damage.

Another considerable advantage of the invention is the adaptability of the apparatus selectively to both a large capacity arrangement and to a lesser capacity arrangement. As shown in FIGS. 4 and 5, there are seven pages 48 utilized. These seven pages, together with the side wings 42, make possible eight different positions or combinations, in each of which twenty selections are available for selection. Thus, the apparatus of these figures represents a phonograph having a capacity of eighty records, or 160 selections.

The arrangement of FIG. 12 shows the apparatus adapted to a phonograph having a capacity of fifty records, or 100 selections. In such case, there are four movable pages and two side wings. On one of the side wings is a spacer 154 which is a panel of a length, in vertical direction, similar to that of the corresponding side wings 42. This spacer is provided with vertically aligned tabs 156 at the top and bottom at one edge which are fitted in aligned apertures 90 and 94, and along the other edge is a flange or securing portion 158 which is secured to the side wing 42 in any suitable manner. The spacer 154 has a main panel portion 156 which, due to the proportions and dimensions of the spacer, is generally parallel with the side wing portion 42, but spaced therefrom inwardly toward the opposite side wing a distance generally or substantially corresponding to three pages, these three pages having been eliminated in reducing the capacity to the extent noted. Similarly, the switches 118 are reduced in number corresponding to the pages utilized and, in this case, are four in number. It will be understood that the capacity may be reduced to other amounts or values than that represented by the four pages in FIG. 12, as will be understood. The spacer 154 thus effectively fills the space otherwise occupied by the omitted pages, and retains the pages, when positioned thereagainst, in an angular position substantially the same as that effected by the corresponding side wing 42.

I claim:

1. A control device of the character disclosed, comprising in combination an enclosure, electrical control means therein including a plurality of switches, a plurality of pages mounted in the enclosure for swinging movement to each of opposite limit positions, the pages being operable for actuating corresponding ones of said switches in movement to at least one of their limit positions, the pages having actuating fingers extending into a common zone, an actuator movable in said zone in each of opposite directions corresponding to respective directions of swinging movement of the pages, and operable for engaging the actuating fingers and swinging the pages, the actuator having a leading edge effective in each direction of movement of the actuator, and the actuator having a portion relative to each leading edge for positively engaging those pages that have been moved by the corresponding leading edge and operative for retaining those pages against movement in the opposite direction until so moved by the opposite leading edge, and means for moving said actuator, including a manually manipulable knob on the exterior of the enclosure adapted for grasping by the hand.

2. The invention set out in claim 1 wherein friction clutch means is interposed between said knob and actuator, releasable in response to excessive force applied to the knob in manipulating it.

3. The invention set out in claim 1 wherein said actuator, when stationary, positively blocks swinging movement of the pages in either direction, from other sources.

4. The invention set out in claim 2 wherein said clutch means includes mating parts, one part including a transverse pin and the other part including a collar slidable into and out of engagement with the pin and having recesses for receiving the pin, and spring means biasing the collar into engagement with the pin.

5. A control device of the character disclosed comprising an enclosure, electrical control means in the enclosure including a plurality of switches for controlling the electrical control means, a plurality of pages mounted for swinging movement about axes lying substantially in a common plane to each of opposite limit positions, the pages corresponding in number to the switches and each page being operable for actuating a corresponding switch in movement to at least one of its limit positions, means yieldingly holding the pages in each of their opposite limit positions, the pages having actuating fingers extending therefrom in a common zone on a rear side of the plane containing said axes, a slider mounted for movement in said zone in each of opposite directions transverse to said axes, said actuating fingers including two on each page, said slider having a pair of working edges facing in opposite directions and arranged for engaging respective ones of said fingers on each page, and the slider thereby being operable in its movements for swinging said pages in directions corresponding to its own directions of movement, and means for moving said actuator, including a manually manipulable knob on the exterior of said enclosure for grasping by the hand.

6. The invention set out in claim 5 wherein the slider includes solid surfaces trailing said working edges relative to the directions of movement of the slider for engaging corresponding ones of the actuating fingers of the pages, for retaining the pages in their limit positions in which they happen to repose in any given stationary setting of the slider.

7. The invention set out in claim 5 wherein the means for moving the actuator includes a rack on the slider, and a shaft is provided with a pinion engageable with the rack, said shaft being rotatable by said knob.

8. The invention set out in claim 5 in which the two fingers on each page are disposed mutually oppositely at an angle to the plane of the page, and the working edges of the slider engage respective ones of said fingers on each page.

9. The invention set out in claim 8 in which the working edges of the slider are mutually displaced in the direction of the axes of the pages, and each is followed by a solid portion of the slider in trailing direction relative to the movement of the slider whereby as each finger of a page is engaged by the respective leading edge of the slider and the page is moved to its opposite position, the engaged finger swings to a position for locking engagement by the respective solid portion, and the other finger is enabled to move into a void of the slider.

10. The invention set out in claim 9 wherein the corresponding fingers of adjacent pages are relatively offset in the direction of said axes, and each page is provided with a notch in alignment with each finger on the adjacent page whereby to enable the pages to be mounted in close proximity, and in their opposite limit positions the fingers of each page are received in the notches in the adjacent pages.

11. A control device of the character disclosed comprising an enclosure, control means in the enclosure including switches for controlling the control means, means having elements for detachably mounting a normal complement of pages, a plurality of pages less than said normal complement detachably mounted in said mounting means for swinging movement to each of opposite limit positions, said pages each being mounted on an axis adjacent an edge thereof and the axes of the plurality of pages lying in a common plane, side wings positioned transversely beyond but adjacent the outermost axes of a said normal complement of pages diverging in a forward direction at an angle to the plane containing said axes, said wings being adapted for engagement by the adjacent outermost pages of said normal complement for limiting movement of said pages to their said limit positions, spacer means detachably mounted in said frame and having a surface when so mounted approximating parallelism with the coresponding adjacent side wing, but spaced inwardly therefrom in a direction along the plane of said axes and transverse to said axes whereby to provide a limit member opposed to the opposite side wing, said spacer means being mounted in a normal position of a page when a said normal complement of pages is mounted in said mounting means, whereby to provide a zone of swinging movement of the pages less than that provided by said stationary side wings, said pages corresponding in number to said switches and operable for actuating corresponding ones thereof in movement to at least one of their limit positions, an acuator for moving said pages, and means for operating said acuator including a manually manipulable knob on the exterior of said enclosure.

12. The invention set out in claim 11, wherein the means for mounting said pages includes upper and lower parallel members having aligned holes for each page, and each page includes tabs pivotally disposed in said holes, and the spacer means includes a plate having corresponding tabs positionable in aligned ones of said holes, in replacement of a corresponding page.

References Cited by the Examiner
UNITED STATES PATENTS

| | | | |
|---|---|---|---|
| 2,375,228 | 5/1945 | Kelsey | 40—104 |
| 2,634,402 | 4/1953 | Vanderzee et al. | 340—162 |
| 2,759,169 | 8/1956 | Nelson | 340—162 |
| 2,909,761 | 10/1959 | Rockola | 340—162 |

NEIL C. READ, *Primary Examiner.*

H. I. PITTS, *Assistant Examiner.*